Patented Feb. 27, 1945

2,370,574

UNITED STATES PATENT OFFICE 2,370,574

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941, Serial No. 424,666

8 Claims. (Cl. 260—78)

This invention relates to a new group of unsaturated esters and their polymers. These new esters are the diesters of (a) carbonic acid and (b) an unsaturated alcohol ester of glycolic acid. The compounds are capable of polymerization to form clear transparent products having high tensile strength and great resistance to breakage.

The unsaturated esters preferably contain unsaturated groups having two to five carbon atoms as contained in unsaturated alcohols such as vinyl, allyl, methallyl, crotyl, isocrotyl, propargyl, methyl vinyl carbinyl, butadienyl, tiglyl, angelyl, dimethyl vinyl carbinyl, etc. alcohols and the halogen substituted products of the above alcohols such as 2-chloroallyl, chlorocrotyl or bromoallyl alcohols. Esters of higher molecular weight alcohols containing six to ten also yield satisfactory products. Thus, we may use alcohols such as cinnamyl, phenyl propargyl and ethyl isopropenyl carbinyl alcohols, 2-hexenol-1, 2,4-hexadienol-1, linalool and the corresponding halogen substituted products.

These new esters have the structural formula:

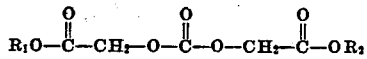

in which $R_1$ and $R_2$ are unsaturated radicals derived from the unsaturated alcohol. $R_1$ and $R_2$ may be the same or different groups.

The new compounds may be prepared by reacting the glycolates of unsaturated alcohols such as vinyl glycolate, allyl glycolate, methallyl glycolate, crotyl glycolate, etc., with phosgene in the presence of an alkaline reagent such as pyridine or other tertiary cyclic amine or other alkaline reagent such as the oxides, hydroxides, and carbonates of strongly alkaline metals such as sodium, potassium, barium, calcium, strontium, and magnesium. The reactions are preferably conducted at temperatures below room temperature, for example, at 0° C. to 10° C. by submerging the reaction vessel in a salt-ice mixture.

The unsaturated esters described herein are generally high boiling liquids some of which are capable of being distilled at reduced pressures. Other esters are solid at normal temperatures. Most of the liquid esters are clear, colorless and miscible with numerous organic solvents such as acetone, alcohol, chloroform, dioxane, benzene, zylene, toluene, ethyl ether, paraffin hydrocarbons, etc. The monomeric esters are valuable as plasticizers for various resin materials such as styrene, cellulose, vinyl, urea, protein, phenolic, or acrylic resins. Other uses such as solvents, insecticides and liquid coating compositions are noteworthy.

These new compounds polymerize in the presence of heat or light or other catalyst to yield solid or liquid compositions of widely differing physical properties. The polymerization is preferably conducted in the presence of catalysts such as oxygen, ozone, or organic peroxides such as lauroyl, benzoyl, and acetone peroxides.

The products of polymerization vary greatly in their physical properties depending upon the molecular structure of the monomer as well as upon the extent of polymerization. In general, the polymers are transparent and colorless and upon complete polymerization, a resin which is substantially insoluble and infusible at atmospheric pressure is produced. A range of resins from hard, brittle products to soft flexible materials are secured. In the ultimate state the polymers are substantially unaffected by acids, alkalies, water, and organic solvents. Intermediate polymers having a wide range of properties may be secured. Upon the initial polymerization of liquid monomers or solutions of the monomers in suitable solvents, an increase in the viscosity of the liquid is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable while for acetone peroxide temperatures of 140-150° C. may be used. The soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other material which inhibits polymerization in the presence of a peroxide catalyst. Thus, a sheet is produced which is hard and smooth on one side while being soft and tacky on the other. The sheet may then be finished by coating the tacky side with monomer or syrupy polymer and polymerizing it in contact with a smooth plate to the insoluble infusible state. Often it is found desirable to release the polymer from the plate one or more times during polymerization of the coating in order to minimize formation of cracks or other surface defects.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2 to 5 percent of benzoyl peroxide until the viscosity of the solution has increased about 100 to 500 percent. This may require several hours while heating at 65-85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered, decanted, or otherwise separated and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulvurulent form and used as a molding powder. Alternatively, a desirable polymer may be prepared by emulsifying the monomer or a syrup polymer in an aqueous medium with or without a suitable emulsification agent such as polyvinyl alcohol, polyallyl alcohol, polymethallyl alcohol, etc. and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1–5 percent of benzoyl peroxide generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium silicate, etc., plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be co-polymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, may be useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble infusible state.

The following examples are illustrative:

*Example I*

Two moles of glycolic acid (152 gms.) were esterified with 116 gms. of allyl alcohol in 500 cc. of benzene. The reaction was conducted at reflux temperature in the presence of 1.5 gms. of phenolsulfonic acid to catalyze the reaction. When the reaction was completed and no more water was evolved the benzene solution was cooled to −10° C. on an ice bath. Two hundred grams of pyridine were added and phosgene was bubbled through the solution at a rate such that the temperature was maintained between 0° C. and +15° C. throughout the reaction. When the reaction was completed the benzene solution was washed with dilute HCl and with Na₂CO₃ and dried over CaCl₂. The bis (carballyloxymethyl) carbonate having the structure:

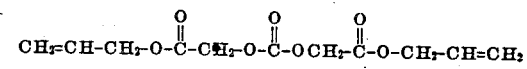

was separated by evaporating the benzene solution under reduced pressure.

*Example II*

Glycolic acid (75 gms.) and 70 gms. of methallyl alcohol were reacted in a solution of 300 cc. of carbon tetrachloride. The solution was refluxed at 75–80° C. for 2 hours in the presence of one gram of p-toluenesulphonic acid. The reflux condenser was provided with a means for continuously separating the carbon tetrachloride from the water. After two hours the reaction was substantially completed and the mixture was permitted to cool to room temperature overnight. An excess of pyridine was added (110 gms.) and the mixture was cooled to +5° C. Phosgene was then added at such a rate that the reaction temperature remained between +5 and +15° C. throughout the reaction. When the reaction was completed the benzene solution was washed and dried as in Example I. The solution was then mixed with 3 percent benzoyl peroxide (based on the dissolved ester) and the solution heated at the reflux temperature for 2 hours. At this time the viscosity of the solution had increased greatly. The viscous solution was poured into 500 cc. of methyl alcohol and a light colored gel was precipitated. The polymeric gel was recovered by decantation and dried.

A five-gram sample of the dried resin was mixed with 5 percent of benzoyl peroxide and pressed in a heated mold under a pressure of 2000 pounds per square inch at a temperature of 135° C. A hard transparent resin was produced.

The monomeric bis (carbomethallyloxymethyl) carbonate formed had the structure:

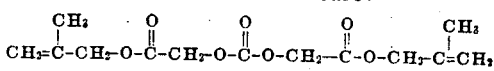

*Example III*

Crotyl glycolate was prepared by direct esterification of crotyl alcohol and glycolic acid. Sixty-five grams of crotyl glycolate was dissolved in 500 cc. of benzene and 85 cc. of pyridine. The solution was then treated with phosgene while the temperature of the mixture was maintained between 0° C. and 10° C. by agitating the solution in a flask submerged in an ice-salt mixture. When the reaction was complete, the benzene solution was washed with 50 cc. of water and dried over sodium sulphate. The ester was separated from the benzol and the more volatile impurities by heating in a vacuum. The bis (carbocrotyloxymethyl) carbonate had the structure:

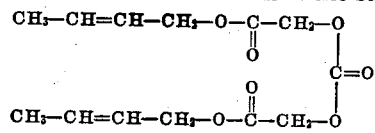

*Example IV*

Twenty-five grams of the ester prepared in Example III was dissolved in 150 cc. benzene and mixed with 3 percent benzoyl peroxide. The solution was heated at 70 to 75° C. until the solution increased materially in viscosity. The thickened liquid was poured into 500 cc. of methyl alcohol and a resinous precipitate was procured. The solid polymer thus produced was filtered and dried. A five-gram sample of the solid polymer was mixed with 5 percent benzoyl peroxide and heated for an hour at 135° C. under 2000 pounds per square inch pressure. A hard transparent solid was obtained.

*Example V*

A fifty-gram sample of the ester prepared in the manner described in Example I was mixed with 5 percent benzoyl peroxide and heated for 2 hours at 60° C. The resulting soft gel was then pulverized in a ball mill with 20 percent Mg₂CO₃ for a period of 15 hours. The pulverulent mixture was then pressed in a mold at 125° C. A white, translucent product with a uniform texture and polished surface was produced.

Although the present invention has been described with reference to certain specific embodiments, it is not intended that the details of such embodiments shall be regarded as limitations upon the scope of the invention except to the extent included in the following claims.

The present case is a continuation-in-part of copending applications Serial No. 365,103, filed November 9, 1940, and Serial No. 361,280, filed October 15, 1940, by Irving E. Muskat and Franklin Strain.

We claim:

1. A diester of carbonic acid and methallyl glycolate.
2. A diester of carbonic acid and crotyl glycolate.
3. A diester of carbonic acid and allyl glycolate.
4. A polymer of the compound described in claim 8.
5. A polymer of the compound described in claim 1.
6. A polymer of the compound described in claim 2.
7. A polymer of the compound described in claim 3.
8. As a new ester, a bis (carbalkenyloxymethyl) carbonate wherein the alkenyloxy radical has an olefinic bond adjacent the second carbon atom from the oxygen atom therein.

IRVING E. MUSKAT.
FRANKLIN STRAIN.